United States Patent
Gourgue et al.

(10) Patent No.: US 6,584,116 B1
(45) Date of Patent: Jun. 24, 2003

(54) METHOD OF TRANSMISSION IN A UMTS MOBILE TELEPHONE NETWORK ENABLING PREPARATION FOR HANDOVER TO A GSM CELL DURING A CALL IN A UMTS CELL

(75) Inventors: Frédéric Gourgue, Paris (FR); Fabienne Roosen, Bourg la Reine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/282,444

(22) Filed: Mar. 31, 1999

(30) Foreign Application Priority Data

Apr. 28, 1998 (FR) .............................................. 98 05286

(51) Int. Cl.⁷ .............................................. H04B 7/212
(52) U.S. Cl. .................. 370/442; 370/321; 370/322; 370/459; 370/528; 370/345; 370/468; 370/337; 370/347; 370/329
(58) Field of Search ................................ 370/458, 468, 370/442, 443, 341, 345, 329, 331, 332, 376, 321, 330, 347, 261, 431, 322, 459, 528, 337

(56) References Cited

U.S. PATENT DOCUMENTS

| | | | | |
|---|---|---|---|---|
| 5,479,410 A | | 12/1995 | Paavonen | 370/332 |
| 5,541,924 A | * | 7/1996 | Tran et al. | 370/347 |
| 5,926,465 A | * | 7/1999 | Schilling | 370/261 |
| 6,064,660 A | * | 5/2000 | Cagney | 370/321 |
| 6,240,076 B1 | * | 5/2001 | Kanerva et al. | 370/330 |
| 6,339,612 B1 | * | 1/2002 | Stewart et al. | 375/140 |
| 6,430,413 B1 | * | 8/2002 | Vedi et al. | 455/442 |
| 6,463,076 B1 | * | 10/2002 | Suzuki | 370/459 |

FOREIGN PATENT DOCUMENTS

| | | |
|---|---|---|
| GB | 2 292 286 A | 2/1996 |
| GB | 2 297 460 A | 7/1996 |
| WO | WO 96/38991 | 2/1996 |

\* cited by examiner

*Primary Examiner*—Wellington Chin
*Assistant Examiner*—Chuong Ho
(74) *Attorney, Agent, or Firm*—Sughrue Mion, PLLC

(57) ABSTRACT

During allocation of time slots of a UMTS frame to a terminal, the UMTS network provides a continuous gap having a duration at least equal to 5 ms in a UMTS frame to enable the receiver of the terminal to measure the power of any GSM signals received and to prepare for possible handover by pre-synchronizing to an adjoining GSM cell.

31 Claims, 2 Drawing Sheets

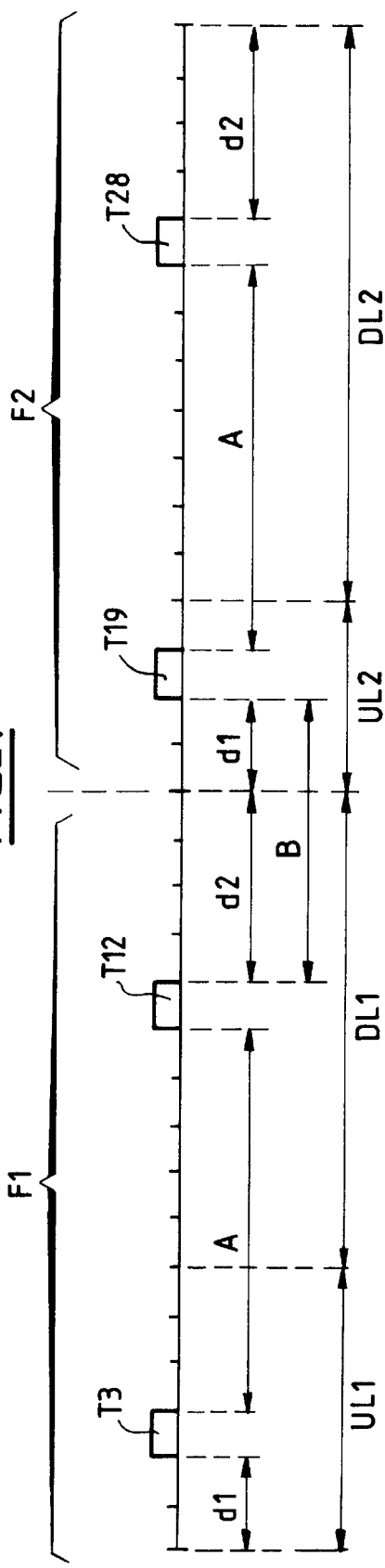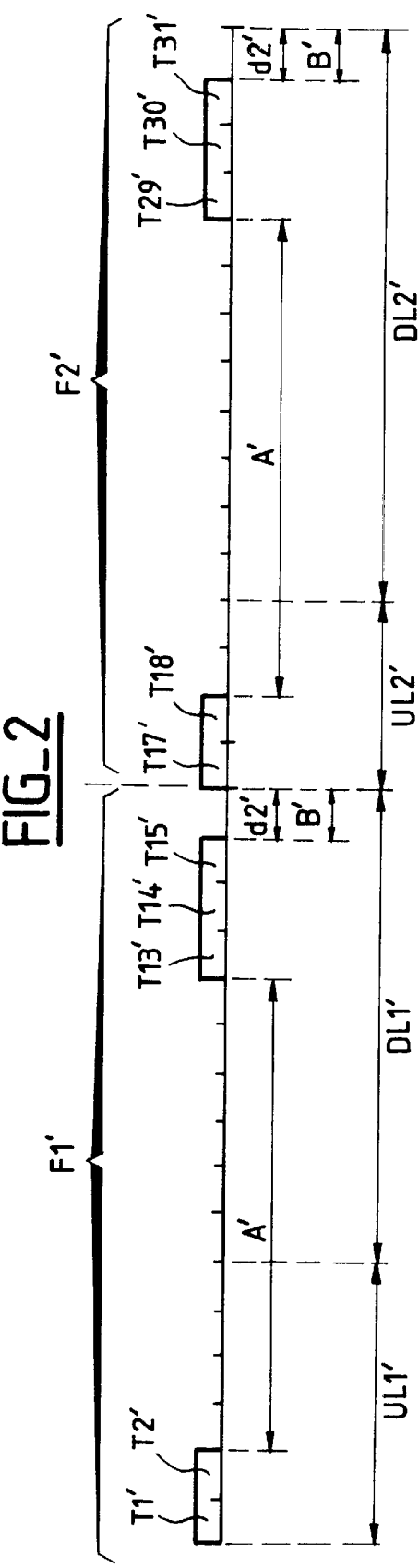

METHOD OF TRANSMISSION IN A UMTS MOBILE TELEPHONE NETWORK ENABLING PREPARATION FOR HANDOVER TO A GSM CELL DURING A CALL IN A UMTS CELL

BACKGROUND OF THE INVENTION

1. Field of the invention

The invention concerns a method of transmission in a UMTS mobile telephone network, especially when operating in time-division duplex (TDD) mode. The UMTS system is the third generation cellular mobile telephone system. The GSM system will continue to exist for some time and the intention is to produce terminals adapted to use the two systems alternately. It must therefore be possible for such terminals to be handed over from a UMTS cell to a GSM cell during a call as the terminal moves around. One of the decision criteria for handover from one cell to another is the power of the signal received by the mobile terminal.

2. Description of the prior art

One known method of handing over a GSM terminal from one GSM cell to another during a call consists in:

having each base transceiver station send a continuous signal on a broadcast control channel (BCCH) carrying synchronization and frequency correction signals specific to one GSM cell, and having each GSM mobile terminal receive the BCCH transmitted in GSM cells adjoining the GSM cell in which it is located, measure the power of any GSM signals received and prepare for possible handover by pre-synchronizing to an adjoining GSM cell.

Each GSM mobile terminal is capable of carrying out a power measurement whilst continuing a call set up in the cell in which it is located. It carries out the measurement in a free time slot provided between an uplink burst and a downlink burst. A GSM type system uses 120 ms multiframes each made up of 26 frames having the same duration, each frame being made up of eight time slots. In each frame an uplink burst occupies a certain number of time slots and a downlink burst occupies a certain number of the remaining time slots. The gap between an uplink burst and a downlink burst generally has a duration of two or four time slots, with one notable exception: in the 26th frame of each multiframe, the gap has a duration corresponding to 12 time slots, that is to say 6 ms. This 6 ms gap enables a portion of the pre-synchronization process to be performed every 120 ms. Pre-synchronization consists in decoding the frequency correction signals and the synchronization signals. The frequency correction and synchronization signals are distributed through a second type of multiframe corresponding to 51 frames. Consequently, pre-synchronization can take up to 1.3 s, with an average duration in the order of 0.6 s.

One transmission method currently under consideration for the UMTS system is the time-division multiplex (TDM) method. It uses frames having identical durations, each frame being in turn made up of time slots each having a given length. A first portion of each frame is allocated to an uplink burst and the remainder of the frame is allocated to a downlink burst, or vice-versa. The maximum number of time slots allocated to the uplink burst and the maximum number of time slots allocated to the downlink burst are fixed and identical for all the terminals, or at least for all the terminals situated in a cluster of UMTS cells. The ratio between the two numbers is chosen in accordance with the nature of the foreseen traffic. If the foreseen traffic is symmetrical, then this proportion is a priori equal to 50%. The proportion can be greater than 50% if the foreseen traffic is strongly asymmetrical.

At present there is no provision for preparing for handover from a UMTS cell to a GSM cell. It is feasible to produce a terminal including two receivers operating simultaneously, a UMTS receiver being used for a UMTS call while a GSM receiver prepares for handover to a GSM cell, but this solution would increase the cost and size of UMTS terminals.

The aim of the invention is to propose a solution that does not necessitate two receivers.

SUMMARY OF THE INVENTION

The invention consists in a method of transmission in a UMTS mobile telephone network enabling preparation for handover to a GSM cell during a call in a UMTS cell, the method consisting in transporting information in frames each made up of a plurality of time slots, time slots from each frame being allocated to mobile telephone terminals, the method further consisting in, for a given terminal, and at intervals equal to an integer multiple of the duration of a frame, not allocating to the terminal considered at least one continuous series of time slots whose total duration is at least equal to a predetermined time period enabling reception of the broadcast control channel from a GSM base transceiver station and pre-synchronization to that GSM base transceiver station.

The above method enables one receiver to handle a UMTS call and prepare for handover to a GSM cell quasi-simultaneously, using the gap available in at least some UMTS frames.

In one particular embodiment, the method in accordance with the invention further consists in reducing the spectral spreading of other time slots carrying data in order to increase their transport capacity.

The above method enables the use of a single receiver even if the terminal is used for a high bit rate service, for example to receive video signals or files, because the method increases the transport capacity of the slots allocated and therefore increases the number of free slots until a gap is obtained of sufficient duration to measure the power of any GSM signals received and prepare for possible handover by pre-synchronizing to an adjoining GSM cell.

The invention will be better understood and other features will become apparent from the following description and the accompanying drawings.

BRIEF DESCRIPTION OF THE DRAWINGS

FIGS. 1 and 2 show respective embodiments of the method in accordance with the invention, respectively for low bit rates and for high bit rates.

DETAILED DESCRIPTION OF THE PREFERRED EMBODIMENTS

Figure 3:
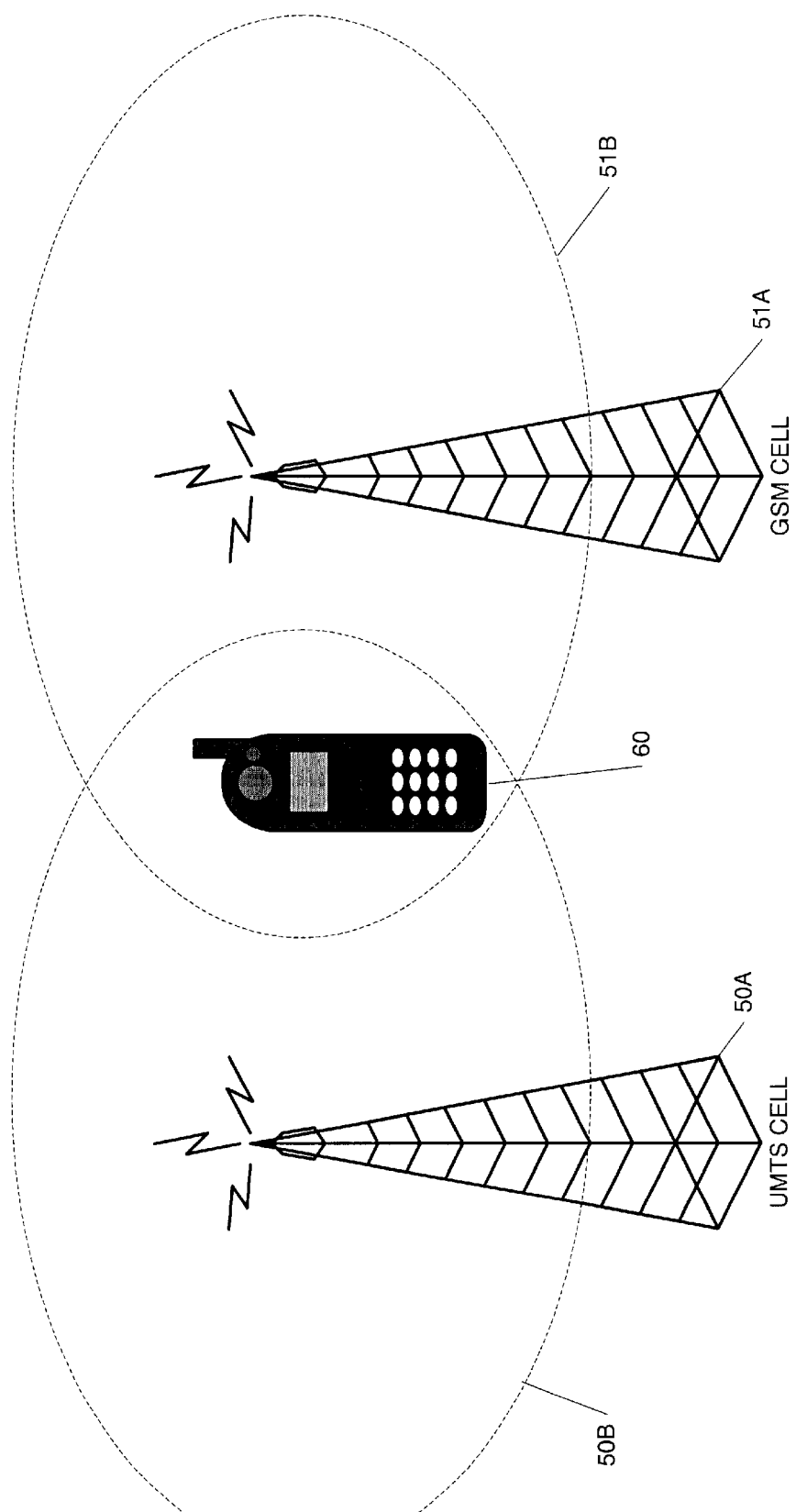
FIG. 3 illustrates UMTS cells connected together, with a GSM cell adjoining the connected UMTS cells.

The method in accordance with the invention applies to all UMTS frames or to only one frame in a UMTS multiframe, comprising a number of frames such that its duration is equal to the duration of GSM multiframes (120 ms). Consider first the situation in which the method is applied identically to all frames.

FIG. 1 shows two successive UMTS frames F1 and F2 each having a duration TF of 10 ms. Each frame is made up of N time slots of duration TS, N being equal to 16 and TS being equal to 0.625 ms, for example.

The allocation of time slots of a frame to terminals is decided by the UMTS network 50, 51 independently for each mobile terminal 60, according to the service requested by the user of each terminal. A terminal requesting only voice call set up requires only one time slot for the uplink connection and one time slot for the downlink connection. In this example the maximum number of time slots allocated to the uplink burst is 6 and the maximum number of time slots allocated to the downlink burst is 10 in all frames. In this example the terminal 60 considered has requested only telephone call setup and therefore a low bit rate. In frame F1 the network 50, 51 allocates only one slot T3 in the portion UL1 reserved to the uplink connection and one slot T12 in the portion DL1 reserved to the downlink connection. In frame F2 the network 50, 51 allocates only one slot T19 in the portion UL2 reserved to the uplink connection and one slot T29 in the portion DL2 reserved to the downlink connection. Thus only two time slots are occupied in each frame.

In frame F1 the terminal 60 considered does not send or receive UMTS signals:

during a time period of duration d1.TS which runs from the start of frame F1 to time slot T3, during a time period of duration A.TS between time slots T3 and T12, and during a time period of duration d2.TS between time slot T12 and the end of frame F1.

In frame F2 the terminal 60 considered does not send or receive UMTS signals:

during a time period of duration d1.TS which runs from the start of frame F2 to time slot T19, during a time period of duration A.TS between time slots T19 and T28, and during a time period of duration d2.TS between time slot T28 and the end of frame F2.

Two types of time period can be used to receive GSM signals, in this example:

with duration A.TS=N.TS−2TS−(d1+d2).TS with duration B.TS=(d1+d2).TS

To enable pre-synchronization in a GSM cell 52, it is considered necessary to receive the GSM broadcast control channel for a continuous time period equal to at least the duration of the GSM frame (4.7 ms) plus a short time period for initializing the receiver, around 5 ms, every 120 ms. According to the invention, the UMTS network 50, 51 allocates the time slots of the frames to the terminal 60 considered in such fashion that the terminal 60 considered does not have to send or receive UMTS signals during a continuous time period having a duration at least equal to 5 ms, at intervals equal to an integer multiple of the duration of a frame.

In the example considered, the table below can be drawn up to determine how to choose d1+d2, i.e. how to allocate the time slots to the terminal 60 considered, given that N=16 and TS=10 ms:

| d1 + d2 | A | B | Conclusion |
| --- | --- | --- | --- |
| ≧8 | <5 ms | ≧5 ms | GSM reception is possible in time period B |
| 7 | 4.37 ms | 4.37 ms | There is no time period of duration at least equal to 5 ms - synchronization may take longer |
| ≦6 | ≧5 ms | <5 ms | GSM reception is possible in time period A |

For technological reasons inherent to TDD mode, the possible choices for allocating time slots to the terminal 60 considered are somewhat restricted: a certain time is required to switch between sending and receiving UMTS signals. The slots allocated to the uplink and downlink connections must not be back-to-back and must be separated by at least one time slot. This constraint rules out allocations such as:

d1+d2=0 and d1+d2=14

In the example shown in FIG. 1, d1+d2=6 and therefore A.TS=8×0.625 ms=5 ms, so the free time period A is suitable for receiving GSM signals.

FIG. 2 shows two successive frames F1' and F2' in the case of a terminal using a higher bit rate service. The terminal 60 therefore requires a greater number of time slots. References similar to those of FIG. 1 are primed. In this example, N=16 and TF=10 ms, as previously. The network 50, 51 allocates the terminal considered time slots T1', T2' for the uplink connection and time slots T13', T14', T15' for the downlink connection in frame F1'. It allocates the terminal considered time slots T17', T18' for the uplink connection and time slots T29', T30', T31' for the downlink connection, in frame F2'. Thus five time slots are occupied in each frame.

Two types of time period can be used to receive GSM signals:

with duration A'.TS=16TS−5TS(d1'+d2').TS with duration B'.TS=(d1'+d2').TS

In the example shown in FIG. 2, a value d1'=0 has been chosen to minimize the duration of B'. In this case A'=(11−d2').TS d2' is made equal to 1 to minimize B', without the UMTS send and receive slots being back-to-back. We get A'=10.TS=6.25 ms, which is greater than the required 5 ms. It is therefore possible for the terminal 60 considered to measure the power of any GSM signals received and to prepare for possible handover by pre-synchronizing to an adjoining GSM cell 52.

If the terminal 60 has to send and receive data at an even higher bit rate, the number of time slots allocated to the downlink connection is a priori greater than 5. It is no longer possible to leave 10 time slots free to obtain a continuous gap of at least 5 ms. Because high bit rate terminals are more costly than low bit rate terminals, consideration may be given to providing them with a second receiver.

Another solution consists in reducing the spectral spreading factor when sending data in the uplink and downlink directions. It is then possible to transmit more data in each time slot. The network then allocates fewer time slots to the data and leaves at least ten time slots free so that there can be a gap of 6.25 ms. On the other hand, it is necessary to increase the send power to retain the same signal to noise ratio.

The scope of the invention is not limited to the situation in which a gap is provided in all UMTS frames. In a different embodiment the UMTS frames constitute multiframes comprising 12 frames each of 10 ms, for example, so as to have the same duration as GSM multiframes, and a single frame per multiframe is adapted to include a gap of at least 5 ms. This embodiment achieves the same performance in terms of GSM cell 52 handover as a conventional GSM terminal.

A variant of the previous solution is to leave one frame of each multiframe totally free, for example the 12th frame of each UMTS multiframe. This frame then provides a gap having a duration 10 ms which is greater than the minimum duration of 5 ms. The downlink data that should have been transported in that frame is transported in other frames of the same multiframe, exploiting the reduced spectrum spreading to increase their transport capacity. On the other hand, the send power must be increased.

What is claimed is:

1. A method of transmission in a UMTS mobile telephone network enabling preparation for handover to a GSM cell during a call in a UMTS cell, the method comprising transporting information in frames each made up of a plurality of time slots, wherein the time slots from each frame being allocated to mobile telephone terminals for communication via the UMTS mobile telephone network, the method further comprising allocating time slots in each frame to a given mobile telephone terminal in such a manner that, at intervals equal to an integer multiple of the duration of a frame, no time slot is allocated to the given mobile telephone terminal for at least one continuous series of time slots whose total duration is at least equal to a predetermined time period, wherein the continuous series of time slots not allocated to the given mobile telephone terminal is used for reception of a broadcast control channel from the GSM cell and pre-synchronization to the GSM cell.

2. The method claimed in claim 3, further comprising reducing the spectrum spreading of other time slots transporting data in order to increase their transport capacity.

3. The method claimed in claim 1, wherein the predetermined time period is greater than or equal to 5 milliseconds.

4. The method claimed in claim 1, wherein the continuous series of time slots not allocated to the given mobile telephone terminal is included within a single UMTS frame.

5. The method claimed in claim 1, wherein the continuous series of time slots not allocated to the given mobile telephone terminal bridges two adjacent UMTS frames.

6. The method claimed in claim 1, wherein the time slots allocated to the given mobile telephone terminal are used for an uplink burst and a downlink burst within a UMTS frame, and the continuous series of time slots not allocated to the given mobile telephone terminal is interposed between the uplink burst and the downlink burst, and the uplink burst and the downlink burst are separated by at least 5 milliseconds.

7. A mobile telephone terminal that receives information transported in a plurality of UMTS frames, each UMTS frame comprising a plurality of time slots, wherein the mobile telephone terminal prepares to continue a call from a UMTS cell in a GMS cell by:
   receiving a series of UMTS frames, wherein each UMTS frame has time slots allocated to the mobile telephone terminal in such a manner that, at intervals equal to an integer multiple of the duration of a UMTS frame, no time slot is allocated to the mobile telephone terminal for at least one continuous series of time slots whose total duration is at least equal to a predetermined time period; and
   using the continuous series of time slots not allocated to the mobile telephone terminal to prepare to continue the call in the GSM cell by receiving a broadcast control channel from the GSM cell and pre-synchronizing to the GSM cell.

8. The mobile telephone terminal claimed in claim 7, wherein the predetermined time period is greater than or equal to 5 milliseconds.

9. The UMTS cell claimed in claim 7, wherein the time slots allocated to the mobile telephone terminal by the UMTS cell are used for an uplink burst and a downlink burst within a UMTS frame, the continuous series of unallocated time slots is interposed between the uplink burst and the downlink burst, and the uplink burst and the downlink burst are separated by at least 5 milliseconds.

10. A UMTS cell that transports information in a plurality of UMTS frames, each UMTS frame comprising a plurality of time slots, wherein the UMTS cell allows a mobile telephone terminal to prepare to continue a call from the UMTS cell in a GMS cell by:
   allocating at least a portion of the time slots in each of the UMTS frames to the mobile telephone terminal in such a manner that, at intervals equal to an integer multiple of the duration of a UMTS frame, no time slot is allocated to the mobile telephone terminal for at least one continuous series of time slots whose total duration is at least equal to a predetermined time period, wherein the continuous series of time slots not allocated to the mobile telephone terminal is used for reception of a broadcast control channel from the GSM cell and pre-synchronization to the GSM cell; and
   transmitting the UMTS frames to the mobile telephone terminal.

11. The UMTS cell claimed in claim 10, wherein the UMTS cell, while allocating time slots to the mobile telephone terminal, reduces the spectrum spreading of other time slots transporting data in order to increase their transport capacity.

12. The UMTS cell claimed in claim 10, wherein UTMS cell sets the predetermined time period to greater than or equal to 5 milliseconds.

13. The UMTS cell claimed in claim 10, wherein the continuous series of time slots not allocated to the mobile telephone terminal by the UMTS cell is within a UMTS frame.

14. The UMTS cell claimed in claim 10, wherein the continuous series of time slots not allocated to the mobile telephone terminal by the UMTS cell bridges two adjacent UMTS frames.

15. A UMTS mobile telephone network including at least one UMTS cell and at least one mobile telephone terminal, wherein information is transported between UMTS cell and the mobile telephone terminal in a plurality of UMTS frames, each UMTS frame comprising a plurality of time slots, the network prepares to handover a call from the UMTS cell to a GMS cell by:
   allocating time slots to a given mobile telephone terminal in such a manner that, at intervals equal to an integer multiple of the duration of a UMTS frame, no time slot in each of the UMTS frames is allocated by the UMTS cell to the mobile telephone terminal for at least one continuous series of time slots whose total duration is at least equal to a predetermined time period;
   transmitting the UMTS frames containing the allocated time slots to the mobile telephone terminal; and
   preparing to continue the call in the GSM cell, wherein the mobile telephone terminal uses the unallocated continuous series of time slots to receive a broadcast control channel from the GSM cell and to pre-synchronize to the GSM cell to prepare for handover to the GSM cell.

16. The UMTS mobile telephone network claimed in claim 15, wherein the UMTS cell reduces, during the allocation allocating the time slots, the spectrum spreading of other time slots transporting data in order to increase their transport capacity.

17. The UMTS mobile telephone network claimed in claim 15, wherein the UMTS cell sets the predetermined time period greater than or equal to 5 milliseconds.

18. The UMTS mobile telephone network method claimed in claim 15, wherein the continuous series of time slots not allocated to the mobile telephone terminal by the UMTS cell is within a UMTS frame.

19. The UMTS mobile telephone network claimed in claim 15, wherein the continuous series of time slots not allocated to the mobile telephone terminal by the UMTS cell allocates the time slots bridges two adjacent UMTS frames.

20. The UMTS mobile telephone network claimed in claim 15, wherein the time slots allocated to the mobile telephone terminal by the UMTS cell are used for an uplink burst and a downlink burst within a UMTS frame, the continuous series of unallocated time slots is interposed between the uplink burst and the downlink burst, and the uplink burst and the downlink burst are separated by at least 5 milliseconds.

21. A method of transmission in a UMTS mobile telephone network, wherein information is transported in a plurality of UMTS frames, the UMTS frames being allocated to mobile telephone terminals for communication via the UMTS mobile telephone network such that a series of UMTS frames is equal to the time duration of a GMS multiframe and the time duration of individual UMTS frames is equal to a predetermined time period, the method further comprises:

allocating, at intervals equal to an integer multiple of the duration of a UMTS frame, all but a portion of one UTMS frame within the series of UMTS frames to the mobile telephone terminals; and using the unallocated UMTS frame portion to prepare to handover a call from a UMTS cell to a GSM cell for reception of a broadcast control channel from the GSM cell and pre-synchronization to the GSM cell.

22. The method claimed in claim 21, wherein the predetermined time period of each of the UMTS frames is greater than or equal to 5 milliseconds.

23. The method claimed in claim 24, wherein, in the allocation of the UMTS frames, the entirety of the single UMTS frame that is not allocated to the mobile telephone terminals is used for GSM broadcast control channel reception and pre-synchronization.

24. A mobile telephone terminal that receives information transported in a series of UMTS frames that are equal in duration to a GMS multiframe, the UMTS frames being allocated to mobile telephone terminals for communication via the UMTS mobile telephone network such that a series of UMTS frames is equal to the time duration of a GMS multiframe and the time duration of individual UMTS frames is equal to a predetermined time period, wherein the given mobile telephone terminal prepares to continue a call from a UMTS cell in a GMS cell by:

receiving a series of UMTS frames, wherein at least a portion of a single UMTS frame in the series of UMTS frames is not allocated to the mobile telephone terminal; and using the portion of the single UMTS frame not allocated to the given mobile telephone terminal to prepare to continue the call in the GSM cell, wherein the given mobile telephone terminal uses the portion of the single UMTS frame not allocated to the given mobile telephone terminal to receive a broadcast control channel from the GSM cell and to pre-synchronize to the GSM cell.

25. The mobile telephone terminal claimed in claim 24, wherein the predetermined time period of a UMTS frame is greater than or equal to 5 milliseconds.

26. A UMTS cell that transports information in a plurality of UMTS frames, the UMTS frames being allocated to mobile telephone terminals for communication via the UMTS mobile telephone network such that a series of UMTS frames is equal to the time duration of a GMS multiframe and the time duration of individual UMTS frames is equal to a predetermined time period, the UMTS cell allowing mobile telephone terminals to prepare to continue a call from the UMTS cell in a GMS cell by:

allocating, at intervals equal to an integer multiple of the duration of a UMTS frame, all but a portion of one UTMS frame within the series of UMTS frames to the mobile telephone terminals, wherein the continuous series of time slots not allocated to the mobile telephone terminals is used for reception of a broadcast control channel from the GSM cell and pre-synchronization to the GSM cell; and transmitting the series of UMTS frames to the mobile telephone terminals.

27. The UMTS cell claimed in claim 26, wherein the UMTS cell sets the predetermined time period of each UMTS frame to greater than or equal to 5 milliseconds.

28. The UMTS cell claimed in claim 26, wherein the frame portion of the UMTS frame not allocated to the mobile telephone terminals is the entirety of the frame.

29. A UMTS mobile telephone network including at least one UMTS cell and at least one mobile telephone terminal, wherein information is transported in a plurality of UMTS frames, the UMTS frames being allocated to mobile telephone terminals for communication via the UMTS mobile telephone network such that a series of UMTS frames is equal to the time duration of a GMS multiframe and the time duration of individual UMTS frames is equal to a predetermined time period, the network prepares to handover a call from the UMTS cell to a GSM cell by:

allocating, at intervals equal to an integer multiple of the duration of a UMTS frame, all but a portion of a single UMTS frame within the series of UMTS frames to the mobile telephone terminals for communication; and using the frame portion not allocated to the mobile telephone terminals to prepare to continue a call from the UMTS cell in the GSM cell, wherein the mobile telephone terminals use the frame portion not allocated to the mobile telephone terminals to receive a broadcast control channel from the GSM cell and to pre-synchronize to the GSM cell.

30. The UMTS mobile telephone network claimed in claim 29, wherein the network sets the predetermined time period of each UMTS frame to greater than or equal to 5 milliseconds.

31. The method claimed in claim 29, wherein, in the allocation of the UMTS frames, the portion of the UMTS frame not allocated to the mobile telephone terminals comprises the entirety of the UMTS frame.

* * * * *